United States Patent  
Baldwin et al.

(10) Patent No.: US 11,817,808 B1
(45) Date of Patent: Nov. 14, 2023

(54) VERTICALLY PACKAGED REDUNDANT VARIABLE FREQUENCY DRIVE

(71) Applicant: ABB Schweiz AG, Baden (CH)

(72) Inventors: Brian J. Baldwin, Summit, WI (US);
Kiese L. Mukana, Waukesha, WI (US);
Ilkka T. Pajari, Greendale, WI (US);
David K. Benson, Sussex, WI (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/879,355

(22) Filed: Aug. 2, 2022

(51) Int. Cl.
*H02P 3/22* (2006.01)
*H02P 27/06* (2006.01)

(52) U.S. Cl.
CPC .................................... *H02P 27/06* (2013.01)

(58) Field of Classification Search
CPC ....................................................... H02P 27/06
See application file for complete search history.

(56) References Cited

U.S. PATENT DOCUMENTS

2020/0249260 A1* 8/2020 Richter ............ G01R 19/16585
2021/0099109 A1* 4/2021 Milivojevic ............ H02P 1/426

* cited by examiner

*Primary Examiner* — Muhammad S Islam
(74) *Attorney, Agent, or Firm* — Leydig, Voit & Mayer, Ltd.

(57) ABSTRACT

A redundant variable-frequency drive (VFD) system including a first VFD and a second VFD each configured to receive an operational status signal from the other, the second VFD being configured to output a drive signal to a motor based on receiving an operational status from the first VFD indicating the first VFD is non-operational, a circuit protection module electrically connected to each of the first VFD and the second VFD, a mounting panel configured for mounting against a mounting surface, each of the first VFD, the second VFD, and the circuit protection module being configured to mount to the mounting panel in a vertically stacked configuration, and a housing configured to encase the second VFD and the circuit protection module against the mounting panel.

19 Claims, 9 Drawing Sheets

VERTICALLY PACKAGED REDUNDANT VARIABLE FREQUENCY DRIVE

BACKGROUND OF THE INVENTION

Conventional equipment, ranging from small appliances to large industrial machines, often require the use motors for constant movement or intermittent actuation. Because grid power is supplied in the form of alternating current (AC) power, AC motors are often used to fulfill these needs. AC motors have various advantages over direct current (DC) motors or other actuation devices, such as decreased startup and power demands, enhanced control over starting current levels and acceleration, enhanced durability, and broader customizability. However, to take full advantage of the benefits offered by AC motors, a Variable Frequency Drive (VFD) is often required.

VFDs are motor controllers that drive an AC motor by varying both the frequency and voltage of its power supply. By controlling the characteristics of power supplied to an AC motor, a VFD can control ramp-up and ramp-down of a motor during a starting or stopping procedure. VFDs are beneficial to a motorized system because they can, for example, reduce energy consumption, improve system efficiency, match motor speed to process requirements, decrease equipment noise levels, and reduce mechanical stress on equipment and motors, thereby extending their lifetimes.

VFDs often require redundancies to ensure equipment can operate without interruption, in spite of system failures, or with less monitoring. As such, redundant VFD systems often include two VFDs, a primary VFD and a secondary VFD, which are typically of the same physical size and packaged side-by-side to one another in a metal enclosure. Such systems are bulky and costly, essentially doubling the size and cost of a VFD system despite only one VFD being used at any given time. Furthermore, VFD redundancy often requires customized solutions to meet the needs of an existing system, thus further increasing cost and leading to cumbersome, retrofitted solutions.

In addition, redundant drive systems typically need an external controller, such as a programmable logic controller (PLC), to control the drive system. This is especially true of highly customized redundancy solutions. Once again, use of an external controller increases overall system cost and complexity, and also creates a single point of failure in the redundant system. Specifically, if the PLC fails, redundancy is lost and the drive system may become non-operational.

To avoid such problems, bypass solutions are sometimes implemented instead of redundant VFD solutions. However, bypass solutions have other restrictions. Critically, for example, many bypass solutions are not configured to run single phase or permanent magnet motors. Furthermore, bypass solutions can only run at a line frequency, therefore losing control of drive speed and torque.

Thus, what is needed is a redundant drive system that is more compact, efficient, eliminates the need for a PLC or other external controllers, and eliminates single-point failures.

BRIEF SUMMARY OF THE INVENTION

The invention provides a redundant variable-frequency drive (VFD) system comprising a first VFD and a second VFD each configured to receive an operational status signal from the other, the second VFD being configured to output a drive signal to a motor based on receiving an operational status from the first VFD indicating the first VFD is non-operational, a circuit protection module electrically connected to each of the first VFD and the second VFD, a mounting panel configured for mounting against a mounting surface, each of the first VFD, the second VFD, and the circuit protection module being configured to mount to the mounting panel in a vertically stacked configuration, and a housing configured to encase the second VFD and the circuit protection module against the mounting panel.

BRIEF DESCRIPTION OF THE SEVERAL VIEWS OF THE DRAWINGS

Subject matter of the present disclosure will be described in even greater detail below based on the exemplary figures. All features described and/or illustrated herein can be used alone or combined in different combinations. The features and advantages of various implementations will become apparent by reading the following detailed description with reference to the attached drawings, which illustrate the following.

DETAILED DESCRIPTION OF THE INVENTION

Figure 1:
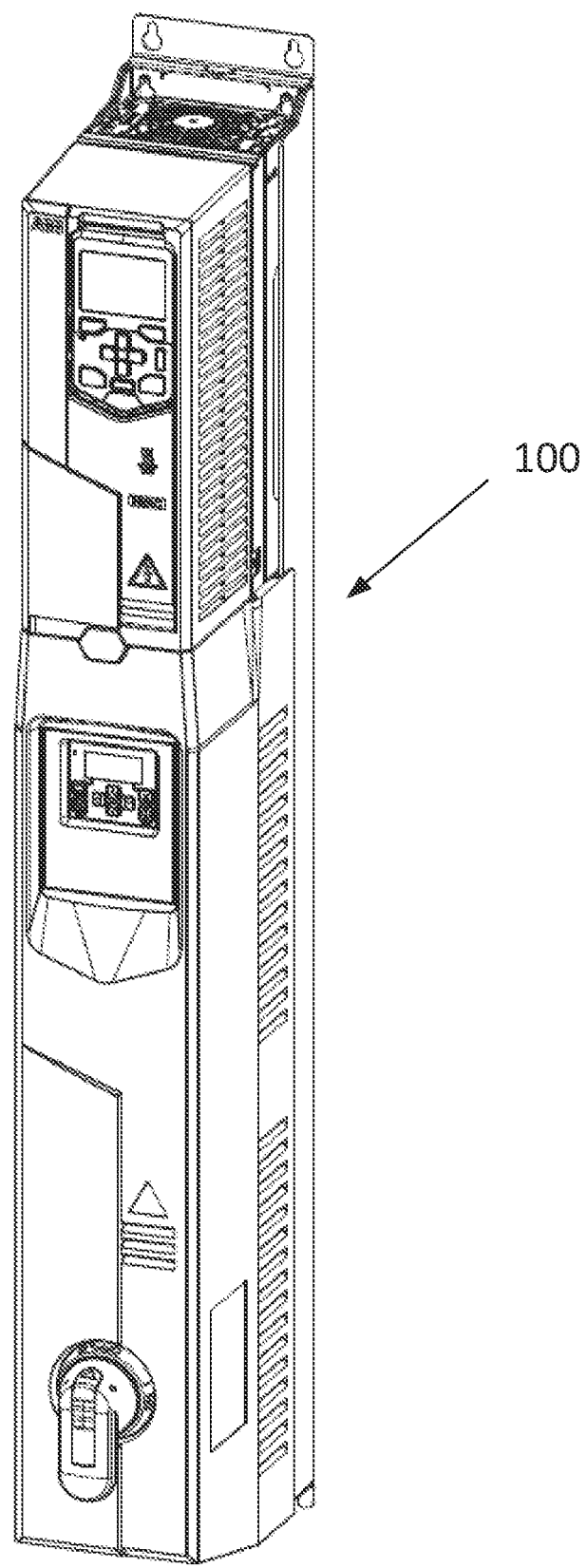
FIG. 1 illustrates an assembled redundant VFD system according to an embodiment of the present invention.

FIG. 1 illustrates an isometric view of an assembled redundant VFD system 100 according to an embodiment of the present invention. In its assembled state, the redundant VFD system 100 is configured as a unitary device optimized to reduce the physical space occupied while balancing utility and user intractability. Specifically, the redundant VFD system 100 taller than it is wide to minimize the horizontal space required by the system. This offers a significant advantage over conventionally wider systems, as horizontal space along the width of walls is often a premium space end user applications due to the limited space typically available for mounting equipment. In some embodiments, the redundant VFD system 100 is between 4 to 10 times taller than it is wide. In some embodiments, the width of the redundant VFD system is no larger than the width of one of the VFD's included within the system. Such configurations allow the redundant VFD system 100 of the present disclosure to replace existing VFD systems by occupying the same horizontal width profile. Advantageously, the vertical height of the redundant VFD system 100 puts VFD displays and user interfaces at an accessible height for a user to interact with the system, thereby balancing both user-friendly ergonomics with space-efficient design.

Figure 2:
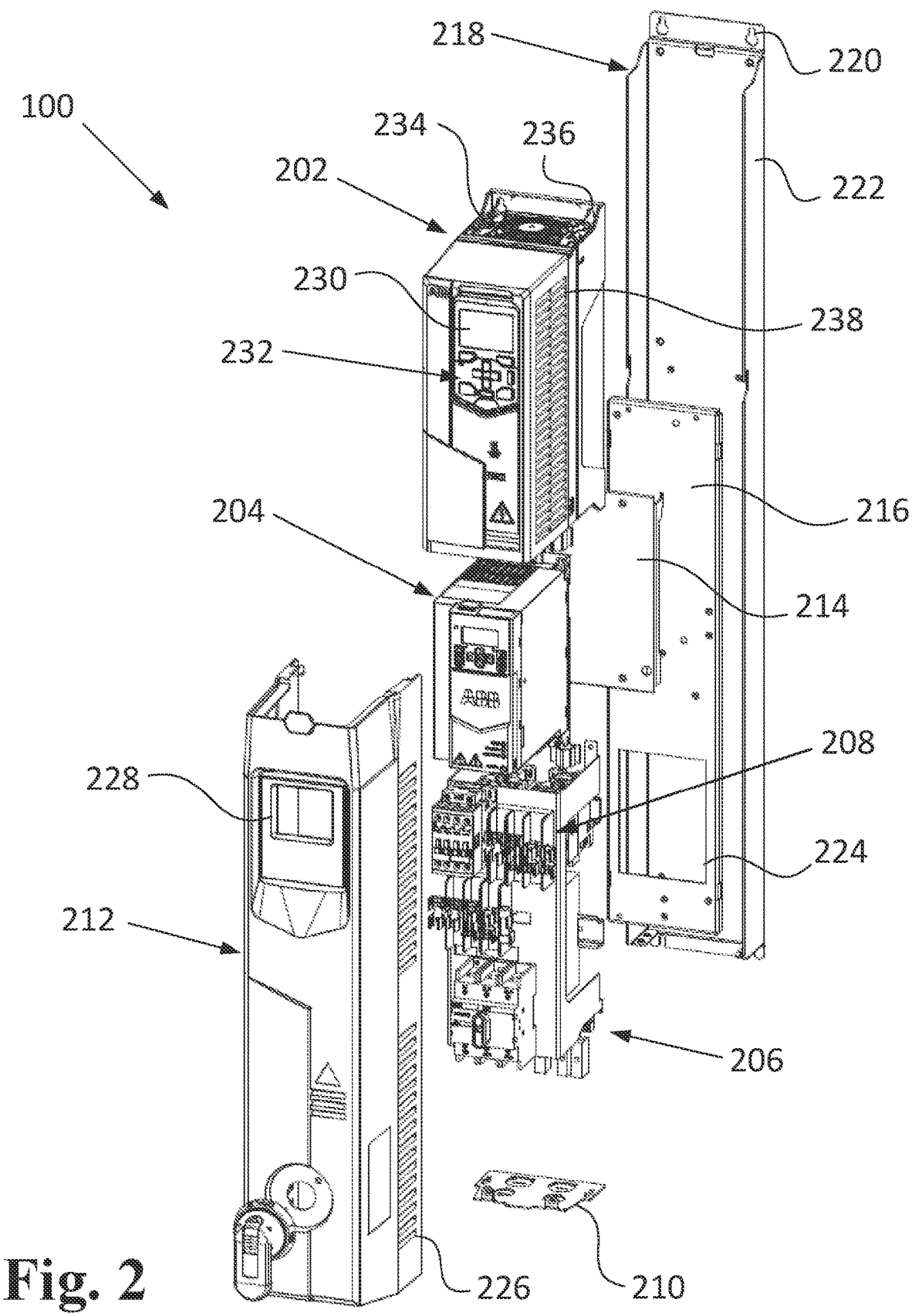
FIG. 2 illustrates an exploded view of the redundant VFD system according to FIG. 1.

FIG. 2 illustrates an exploded isometric view of the redundant VFD system 100 according to an embodiment of the present invention. The redundant VFD system 100 has two VFDs, including a primary VFD 202 and a secondary VFD 204, a circuit protection module 206, a bottom plate 210, a housing 212, a secondary VFD panel 214, an intermediate panel 216, and a mounting panel 218. The primary and secondary VFD 202, 204 each include a display 230 configured to display various information relevant to operation and function of the respective VFD. For example, the display 230 may display a user interface (UI), VFD settings, operational status, operational parameters, warnings, errors, failures, calculations, and the like. In some embodiments the display of the primary VFD can display information about the secondary VFD, and vice versa, by means of connections and methods that will be disclosed in more detail below. The primary and secondary VFD 202, 204 may also each include an input interface 232 comprising one or more buttons, switches, toggles, or other actuators configured to receive physical input from a user. The input interface enables a user to navigate and interact with a UI displayed on the display 230.

Primary VFD 202 also includes ventilation system 234, mounting openings 236, and ventilation openings 238. The ventilation system 234 is configured with a fan that directs exhaust air out of primary VFD 202, or, in some embodiments, directs air into primary VFD 202. Together with the ventilation openings 238, the ventilation system provides air to internal components within the primary VFD 202 for cooling. The primary VFD 202 is configured with internal controllers for controlling the rate at which air is passed through primary VFD 202 by the ventilation system 234, which may depend on factors such as operating time, internal component temperature, and/or current draw. The mounting openings 236 of the primary VFD 202 are configured to allow fastening of the primary VFD 202 to other structural components of the redundant VFD system 100, such as mounting panel 218. It will be readily appreciated that in some embodiments, one or more of ventilation system 234, mounting openings 236, and ventilation openings 238 may also be included in secondary VFD 204. In some embodiments, ventilation system 234 also provides cooling to the electrical components 208. In instances where the primary VFD 202 has failed and the secondary VFD 204 is operational, a ventilation system of the secondary VFD 204 can provide cooling to the electrical components 208. Thus, system redundancy is accomplished not only in terms of outputting a drive signal, but also in terms of ensuring electrical components 208 are adequately cooled regardless of whether one of the primary VFD 202 or secondary VFD 204 has failed or which one is operational.

As shown in FIG. 2, the secondary VFD 204 is physically smaller than the primary VFD 202. However, the primary VFD 202 and the secondary VFD 204 have the same power rating, thus ensuring uncompromised redundancy in case of failure of one VFD or the other. The smaller size of the secondary VFD 204 enables it to fit in housing 212 while maintaining a width profile similar to that of the primary VFD. Furthermore, the smaller size of the secondary VFD 204 enables an overall redundant VFD system 100 that minimizes occupied space while maintaining full function as a redundant VFD system. In some embodiments, the primary VFD 202 and the secondary VFD 204 may be identical units, thus prioritizing modularity, repairability, and ease of use over strict width reduction.

The redundant VFD system 100 also includes a housing 212 configured to cover at least the secondary VFD 204 and the circuit protection module 206. In some embodiments, the housing 212 may include an interface opening 228 through which a user can see and access a display and input interface of the secondary VFD 204. In this way, a user can interact with and adjust the secondary VFD 204 without being required to first remove the housing 212 or to otherwise gain access to the input interface of the secondary VFD 204. In some embodiments, the housing 212 also includes ventilation openings 226 through which air may pass, thus promoting airflow within the redundant VFD system 100 to cool components housed therein.

The circuit protection module 206 include electrical components 208 configured to control electrical signals and current to and from the primary VFD 202 and secondary VFD 204 to avoid damage to the redundant VFD system and/or downstream components. For example, in some embodiments electrical components 208 include fuses as a means of overcurrent protection for internal and external circuitry. In some embodiments, electrical components 208 also include contactors configured to ensure only one drive signal from the primary VFD 202 and the secondary VFD 204 is passed downstream, thus ensuring an excessively large current is not directed downstream that exceeds the power rating of downstream components such as a motor. Further illustrations and descriptions of some exemplary electrical components 208 are included hereafter in the description of FIGS. 3A, 3B, and 4.

The redundant VFD system 100 also includes a plurality of plates and panels configured to provide mounting points for various components and improve rigidity of the system. For example, base plate 210 is arranged at the bottom of the system and configured to provide support for the lower end of the housing 212 and the circuit protection module 206. A secondary VFD panel 214 may be configured as mounting point for the secondary VFD on one side and further configured for mounting to the intermediate panel 216 on an opposite side. This allows a modular design in which the secondary VFD 204 can be easily removed from the redundant VFD system 100 during maintenance, repair, and/or replacement. In some embodiments, the intermediate panel 216 includes a component opening 224 through which circuit protection module 206 or sub-components thereof may extend. In addition to providing more space for portions of the circuit protection module 206, the circuit protection opening 224 may increase the ease with which repairs or maintenance may be conducted on a rear side of the circuit protection module 206 that would otherwise be blocked unless the circuit protection module 206 were removed entirely from intermediate panel 216. In some embodiments, the component opening 224 also promotes airflow within the redundant VFD system 100 when it is fully assembled, thus providing airflow not only more directly to circuit protection module 206, but also indirectly promoting airflow that continues to/from secondary VFD. Promoting airflow throughout the redundant VFD system 100 enables both the primary VFD 202 and the secondary VFD 204 to use a respective ventilation system 234 to cool electrical components 208, which, in the illustrated embodiment, are configured below both the primary VFD 202 and the secondary VFD 204.

As illustrated in FIG. 2, a mounting panel 218 is also provided. One side of the mounting panel 218 is configured for mounting against a mounting surface, such as a facility wall, another piece of equipment, or other structural feature configured for inclusion of a VFD system. Due to the vertically integrated configuration of the redundant VFD system 100, the mounting panel 218 includes mounting openings 220 through which the redundant VFD system 100 may be affixed to a mounting surface using fasteners, such as bolts, braces, brackets, or hooks. Although FIG. 2 shows two such mounting openings 220 at an upper end of the mounting panel 218, it will be readily appreciated that more than two mounting openings 220 may be arranged in various locations of the mounting panel 218 to promote stable fastening of a redundant VFD system 100 against a mounting surface. In some embodiments, mounting panel 218 includes side panels 222 configured substantially orthogonal to a mounting portion of the mounting panel 218. The side panels 222 are arranged on two or more sides of the mounting panel 218 and configured to receive portions of housing 212, thereby providing structural rigidity to a completely assembled redundant VFD system 100 and providing an improved seal resistant to air and dust. Such a seal ensures adequate airflow is achieved where intended in the system by avoiding leakage that would otherwise weaken airflow where it is needed most for cooling one or more of the primary VFD 202, the secondary VFD 204, and/or the circuit protection module 206. The various plates and panels of the redundant VFD system 100 may include a plurality of openings, slots, ridges, and/or protrusions of varying shape and size to enable mounting of system components or to enable mounting of plates and panels to one another to form a cohesive and structurally sound whole when fully assembled.

Figure 3A:
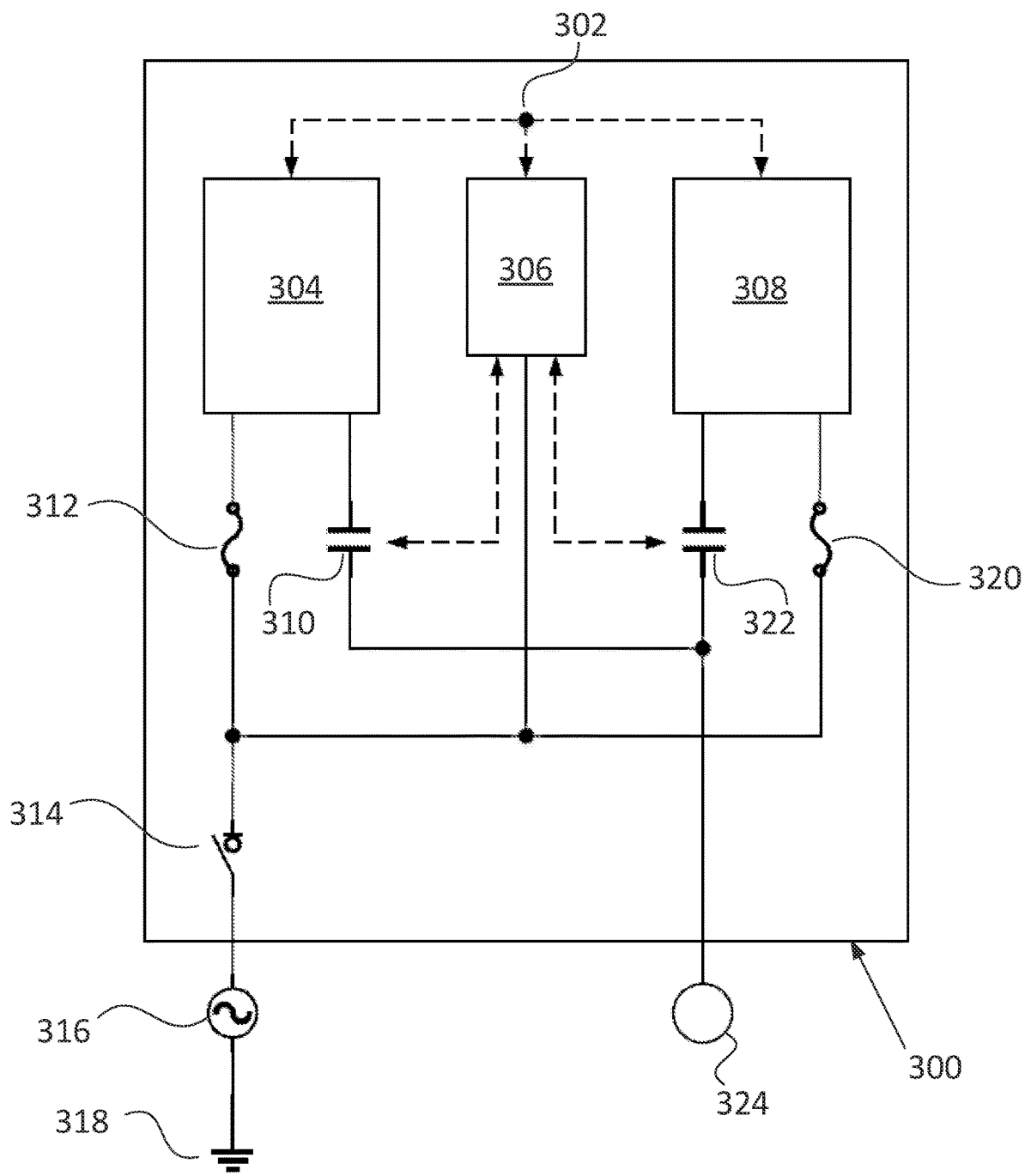
FIGS. 3A and 3B illustrate block diagrams of redundant VFD systems according to embodiments of the present invention.

FIG. 3A illustrates a block diagram of a vertically packaged redundant VFD 300 with master/slave control. The vertically packaged redundant VFD 300 includes a serial communication channel 302, a primary VFD 304, a contactor control 306, and a secondary VFD 308. The serial communication channel 302 is configured to communicate data signals between all three of the primary VFD 304, the contactor control 306, and the secondary VFD 308. The block diagram represents conceptual organization and relationships as opposed to strict structural relationships. For example, the serial communication channel may be integrated structurally with the primary VFD 304 (as would be the case for the primary VFD 202 of FIG. 2, for example) while maintaining a communicative data signal connection with contactor control 306 and secondary VFD 308. The primary VFD 304 and the secondary VFD 308 are each electrically connected to a fuse 312, 320, which stands between the respective VFD and a downstream input switch 314, alternating current (AC) source 316, and ground 318. The input switch 314 acts as a means for preventing AC power input to the entire vertically packaged redundant VFD 300, and may be implemented in the form of a power switch for the entire system. In the event that the input switch 314 is closed when it should not be or when a current exceeding the power rating of the primary VFD 304 and the secondary VFD 308 is generated by the AC source 316, the fuses 312, 320 protect the primary VFD 304 and secondary VFD 308 from damage.

The primary VFD 304 and secondary VFD 308 are each also electrically connected to a first contactor 310 and a second contactor 322, respectively. The first and second contactors 310, 322 toggle electrical connectivity of a respective VFD with a motor 324 that is located external to and downstream of the system. The first and second contactors 310, 322 are controlled via contactor control 306, which may transmit control signals to open and close the first and second contactors 310, 322. By ensuring that only one of the first and second contactors 310, 322 is open at a given moment, the vertically packaged redundant VFD 300 ensures that only a single drive current is output from the primary VFD 304 or the secondary VFD 308 at a given time, therefore protecting the motor 324 from damage or malfunction due to an excessively high current or an unintended signal that results from combining two output signals.

Figure 3B:
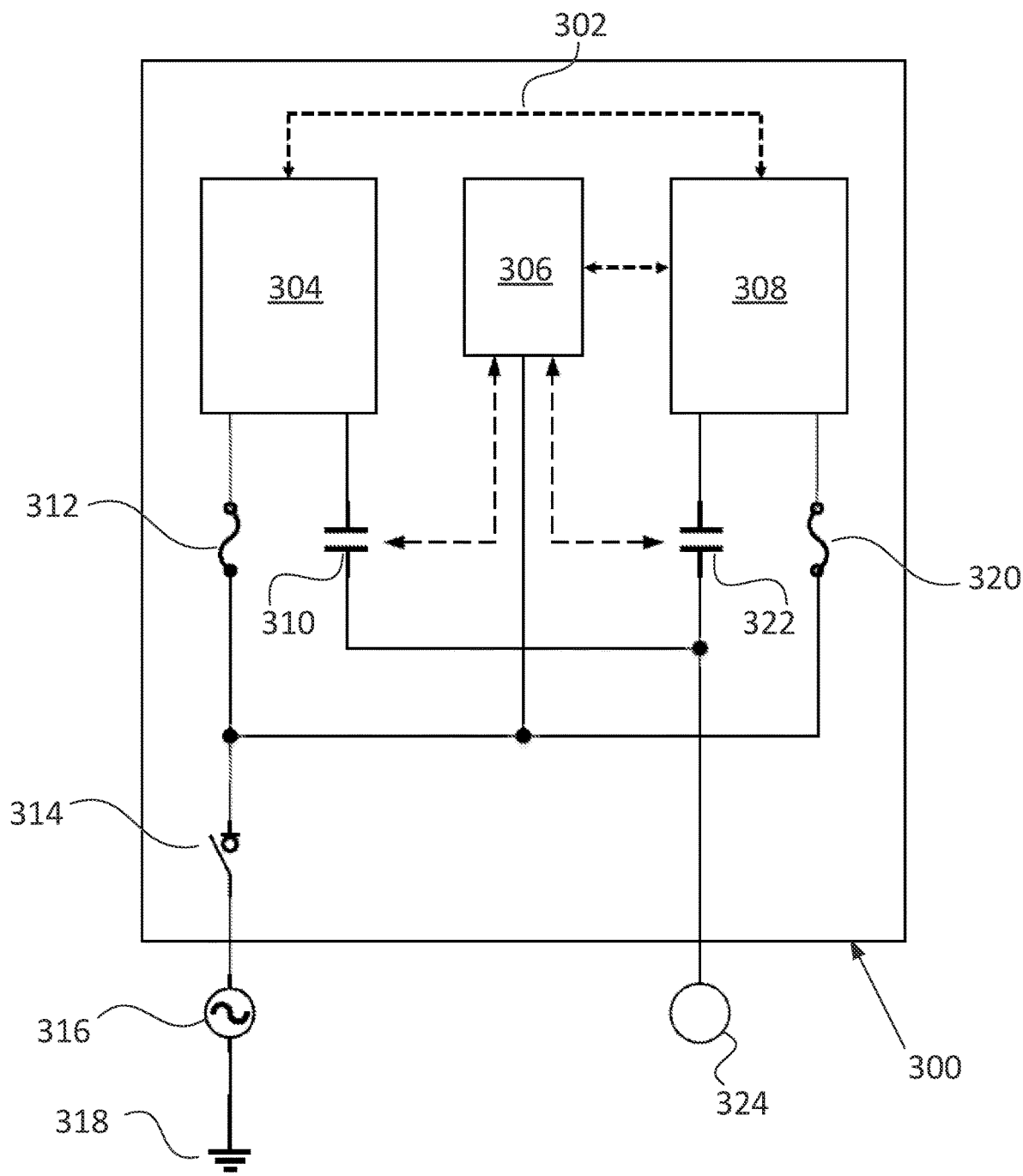

FIG. 3B also illustrates a block diagram of an embodiment a vertically packaged redundant VFD 300 with master/slave control. The serial communication channel 302 is configured for to communicate data signals between the primary VFD 204 and the secondary VFD 308. The secondary VFD 308 is configured to communicate data signals with contactor control 306. In this configuration, the secondary VFD 308 is configured to control the first and second contactors 310, 322 via the contactor control 306. This has the benefit of reducing the complexity of physical data connections and data paths, as information relevant to determining whether to open or close the first and second contactors 310, 322 can simply be communicated exclusively between the primary VFD 304 and secondary VFD 308. The secondary VFD 308 can then use data received from the primary VFD to determine how to open/close first and second contactors 310, 322.

Figure 4:
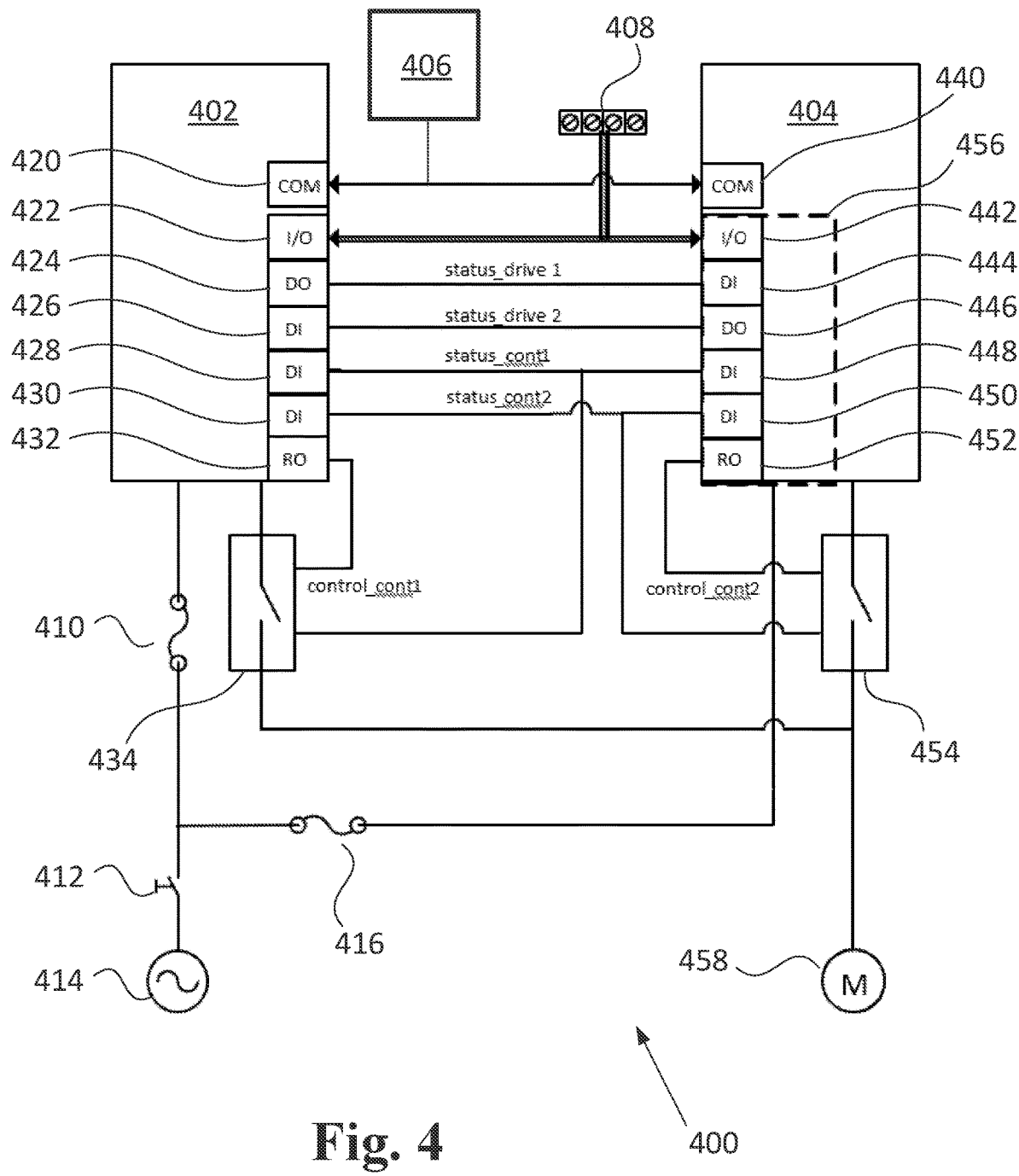
FIG. 4 illustrates a schematic of a redundant VFD system with input/output modules according to an embodiment of the present invention.

FIG. 4 illustrates a schematic diagram of an embodiment of a redundant VFD system 400 according to the present invention, and illustrates in greater detail data connections between a primary VFD 402 and a secondary VFD 404. The primary VFD 402 is electrically connected to a fuse 410, which is located between the primary VFD 402 and an input switch 412 and AC source 414. Likewise, the secondary VFD 404 is electrically connected to a fuse 416, which is located between the secondary VFD 404 and the input switch 412 and AC source 414. As described above in relation to FIG. 3A, the input switch 412 is configured to connect or disconnect both the primary and secondary VFD 402, 404 from AC power, and the fuses 410, 416 are configured to protect a respective VFD from damage or malfunction. The primary VFD 402 and secondary VFD 404 each include a communication portal 420, 440 configured to connect to a display and input interface 406 of one or both of the primary VFD 402 and the second VFD 404. This allows control of either VFD from a single display and input interface 406. In some embodiments, information about both primary and secondary VFD 402, 404 is displayed in a single display, while in some embodiments information is displayed in a display of each of the primary and secondary VFD 402, 404. This is a particular advantage over conventional systems in which information is displayed separately and inputs are entered separately, which increases the likelihood of human error via incompatible inputs from competing systems and can be cumbersome. In some embodiments, a display and input interface 406 of just one of either the primary and secondary VFD 402, 404 can be utilized to control or transmit inputs to both the first and second VFDs 402, 404 simultaneously.

In some embodiments, communication portals 420, 440 are additionally configured as serial communication links that can communicate more than just data for display and input interface 406. For example, such a serial communication link can be used for direct data transmission between the primary VFD 402 and secondary VFD 404, enabling both drives to transmit analog data to each other. Such data may include, for example, motor overload level for motor overload protection, cumulative output power for the redundant VFD system, or other measured or calculated quantitative data relevant to VFD or motor operation.

Each of the primary VFD and secondary VFD 402, 404 also include an input/output module 456 that further include input/output ports 422, 442, first status ports 424, 444, second status ports 426, 446, first contactor status ports 428, 448, second contactor status ports 430, 450, and contact control ports 432, 452. The input/output ports 422, 442 enable data input and output between the primary and secondary VFD 402, 404 and from each VFD to external data port 408. The external data port 408 enables the redundant VFD system 400 to communicate operational data to an external device for storage or monitoring. For example, error log data or performance data, which may include the operation timestamps, drive output values, or other internal sensor data, may be transmitted via the external data port 408 for storage or analysis by a user and/or a separate system. The external data port 408 may also communicate input data to the each of the primary and secondary VFD 402, 404. This may allow, for example, the primary and secondary VFD 402, 404 to receive firmware updates, updated data in the case of an internal data loss, or operating instructions. In some embodiments, an external controller may be connected to external data port 408 to temporarily take over operation or non-operation one or both of the primary and secondary VFD 402, 404. This is particularly advantageous in cases where an override of internal programming may be required via an external controller to keep the redundant VFD system operational while maintenance is being performed, as the external controller can ensure a drive signal is sent by at least one VFD to motor 458 despite internal protocols that may be triggered by maintenance of one VFD. In some embodiments external data port may comprise relay outputs which can be built into the VFD or into an extension card.

The first status ports 424, 444 are configured for the primary VFD 402 to transmit an operational status of the primary VFD 402 to the secondary VFD 404. The operational status is a data signal indicating whether or not the VFD is functionally capable of operating as a VFD. For example, binary signal may be used in which the presence of a signal indicates that a VFD is operational, while the absence of the signal indicates failure of the VFD or a condition in which the VFD is not capable of outputting a drive signal. In some embodiments, a binary signal may be used in the opposite configuration such that the presence of a binary signal indicates a failure, while the absence of such a signal indicates normal operative status. The second status port 426, 446 is configured for the secondary VFD 404 to transmit an operation status of the secondary VFD 404 to the primary VFD 402. This configuration of first status ports 424, 444 and second status ports 426, 446 allows each VFD to know the operational status of the other at all times. Thus, secondary VFD 404 can immediately determine primary VFD 402 is non-operational based on receiving a signal (or lack thereof) indicating that primary VFD 402 has ceased operating, and vice versa. If the secondary VFD 404 determines that the primary VFD 402 is non-operational, the secondary VFD 404 transition to an operational status in which it may output a drive signal in place of the primary VFD to provide system redundancy. If an operational VFD determines that the other VFD is non-operational, it may output a warning via communication port 420,440 that system redundancy is lost. For example, if primary VFD 402 is operational but receives a signal via second status port 426 that secondary VFD 404 is non-operational, an error or warning symbol or message may be displayed via display and input interface 406 of one or both VFDs to indicate to a user that redundancy has been compromised.

The first contactor status ports 428, 448 are configured for each of the primary VFD 402 and secondary VFD 404 to receive a status of the first contactor 434 that is controlled by the primary VFD 402. The second contactor status ports 430, 450 are configured for each of the primary VFD 402 and secondary VFD 404 to receive a status of the second contactor 454 that is controlled by the secondary VFD 404. This configuration allows each VFD to know the status of each contactor at all times, regardless of one VFD's ability to report it. For example, if the primary VFD malfunctions and is unable to transmit a status change of the first contactor 434 from closed to open, the secondary VFD 404 can still determine the status change via direct connection to first contactor 434 and resume operation of the motor 458 by transmitting a drive signal in place of the primary VFD 402. Vice versa, the primary VFD may monitor the status of the second contactor 454 to determine whether it should be operational or output a drive signal in the secondary VFD's place. Thus, greater redundancy safeguards are achieved by dual monitoring of the state of each of the first and second contactors 434, 454.

The primary VFD 402 includes a contactor control 432 port configured to transmit a control signal to the first contactor 434. Similarly, the secondary VFD 404 includes a contactor control port 452 configured to transmit a control signal to the second contactor 454. In this manner, each VFD is configured to control only its respective contactor. This allows each VFD to open its respective contactor upon ceasing operation or handing over output operation to the other VFD, or to close its respective contactor upon resuming operation or being handed over output operation from the other VFD. Because each of the first and second contactors 434, 454 are controlled only by either the primary or secondary VFD 402, 404, respectively, competing control signals from both VFDs can be avoided. This reduces the likelihood of malfunctions or damage as a result of both VFDs being opened or closed, which may result in diminished performance or damage to the motor 458.

In conventional systems, one or more of the ports 420, 422, 424, 426, 428, 430, 432, 440, 443, 444, 446, 448, 450, 452 may be connected to an external controller, which is configured exclusively to control one or more VFDs and use input data to carry out redundancy operations. However, by connecting these ports from one VFD to another, the need for an external controller to perform redundancy operations is avoided, and programming to carry out redundancy operations can instead be implemented in an individual VFD. Thus, in some embodiments, the need for an external controller is entirely eliminated.

Figure 5:
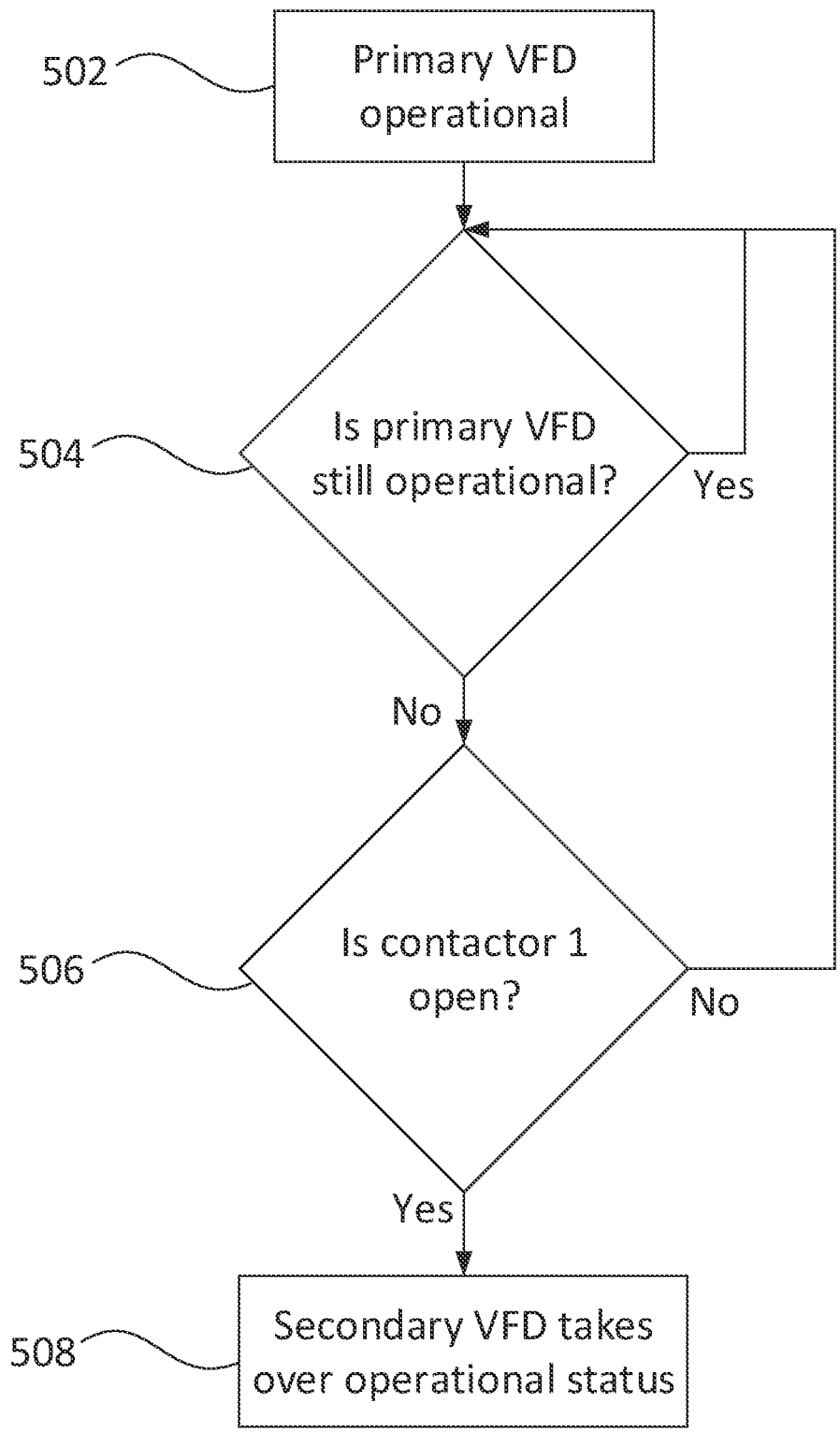
FIG. 5 illustrates a logic diagram according to an embodiment of the present invention.

FIG. 5 illustrates a logic diagram according to an embodiment of the present invention. The diagram begins with default operation 502, which, in the illustrated embodiment, consists of the primary VFD beginning or continuing to transmit an operational status indicating it is able to output a drive signal to a motor. During operation, one or both of the primary and secondary VFD may perform the logical routine as depicted in the logic diagram. For example, in a scenario where the primary VFD is operational, the secondary VFD may be programmed to carry out query 504 by determining whether the primary VFD is operational. If the primary VFD is still operational, the query 504 is repeated. Repetition of query 504 may occur on the basis of a timer, through which expiration of a pre-determined or configurable time period triggers query 504, or based on another data input from a VFD or a contactor in the redundant VFD system. If query 504 is carried out and the primary VFD is determined to be non-operational, the secondary VFD proceeds past query 504. In some embodiments, the secondary VFD may proceed by transitioning to operational status, thus taking over by outputting a drive signal as required in place of the primary VFD. In the depicted embodiment, secondary VFD proceeds by carrying out query 506, in which the secondary VFD determines whether or not the first contactor is open. In the depicted embodiment, the secondary VFD is configured to repeat query 504 if the first contactor is not open. By doing so, a scenario is entirely avoided in which the primary VFD is outputting a drive signal and erroneously reporting non-operation, causing the secondary VFD to additionally output a drive signal that interferes with or adds to the drive signal received downstream, which may cause malfunction and/or damage to downstream components and/or a motor. Instead, secondary VFD proceeds to take over operational status 508 only if the first contactor is determined to be open under query 506, thus ensuring a drive signal is safely output only when an electrical separation of the primary VFD from the motor is carried out.

Figure 6:
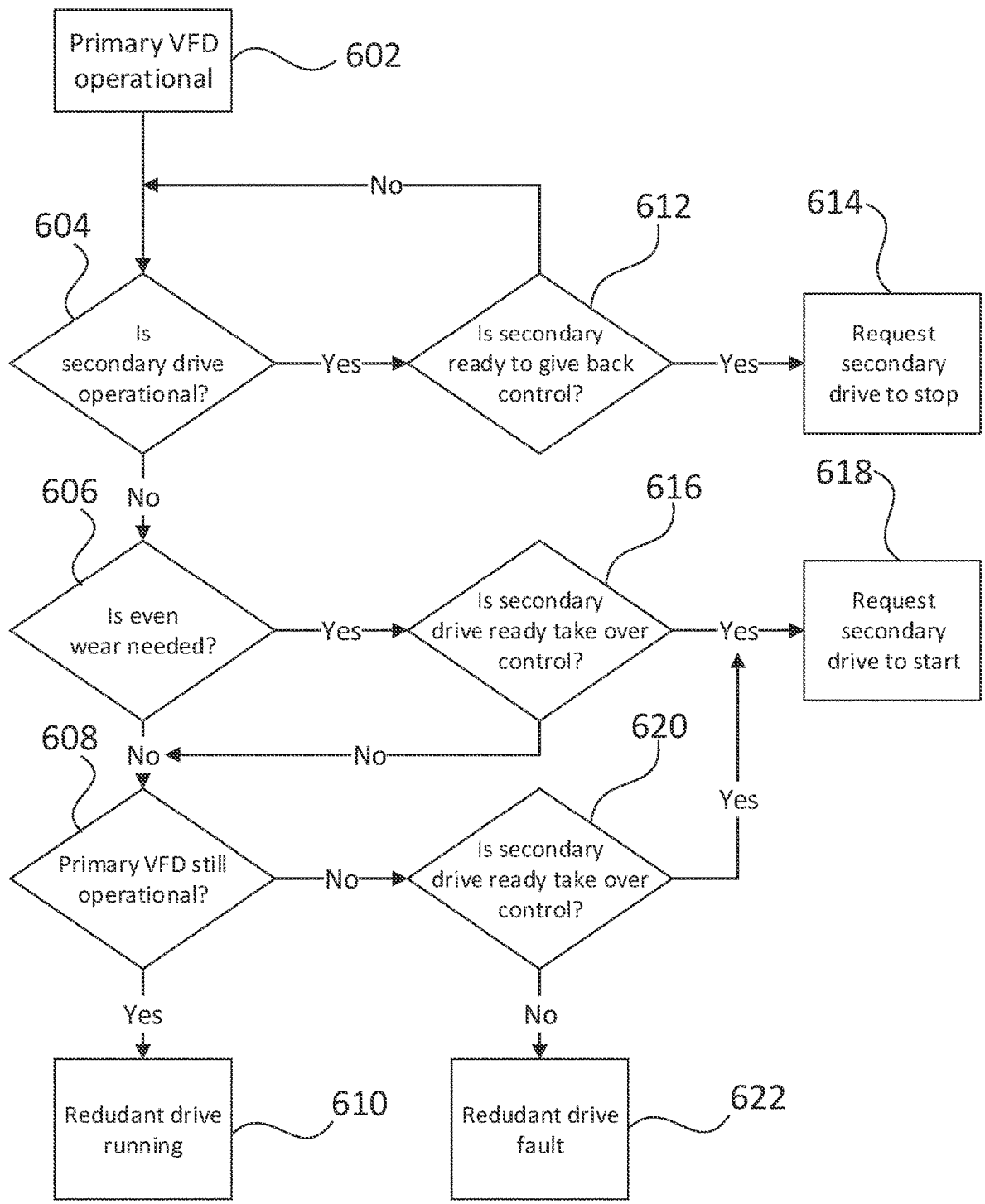
FIG. 6 illustrates a logic diagram for an operational primary VFD in an embodiment of the present invention.

FIG. 6 illustrates a logic diagram for a primary VFD according to an embodiment of the present invention. The diagram begins with an operational primary VFD 602. While the primary VFD is operational 602, a determination may be made as to whether the secondary drive is operational in query 604. If the secondary drive is not operational, a determination may be made as to whether the even wear between the primary and secondary VFDs is needed in query 606. If even wear is not needed, a determination may be made as to whether the primary VFD is still operational in query 608. If the primary VFD is not operational, then a determination 610 can be made that a redundant drive is running, or, in other words, that the VFD system's redundancy is operational and may be utilized in circumstances where one VFD fails.

If, in query 604, it is determined that the secondary drive is operational, a determination may be made as to whether the secondary drive is ready to give control back to the primary VFD in query 612. If the secondary VFD is ready to give back control, a request 614 may be executed to stop the secondary drive. If the secondary VFD is not ready to give back control back to the primary VFD, query 604 may be repeated. If, in query 606, it is determined that even wearing of the primary and secondary VFDs is required, a determination may be made as to whether the secondary drive is ready to take over control in query 616. If the secondary drive is ready to take over control, a request 618 may be executed to start the secondary drive. If the secondary drive is not ready to take over control, the logic process may proceed to query 608. If the primary VFD is determined to not be operational in query 608, a determination may be made as to whether the secondary VFD is ready to take over control in query 620. If, in this circumstance, the secondary drive is ready to take over control, the request 618 may be executed to start the secondary drive. If the secondary is not ready to take over control, then a determination 610 can be made that a redundant drive fault has occurred.

Figure 7:
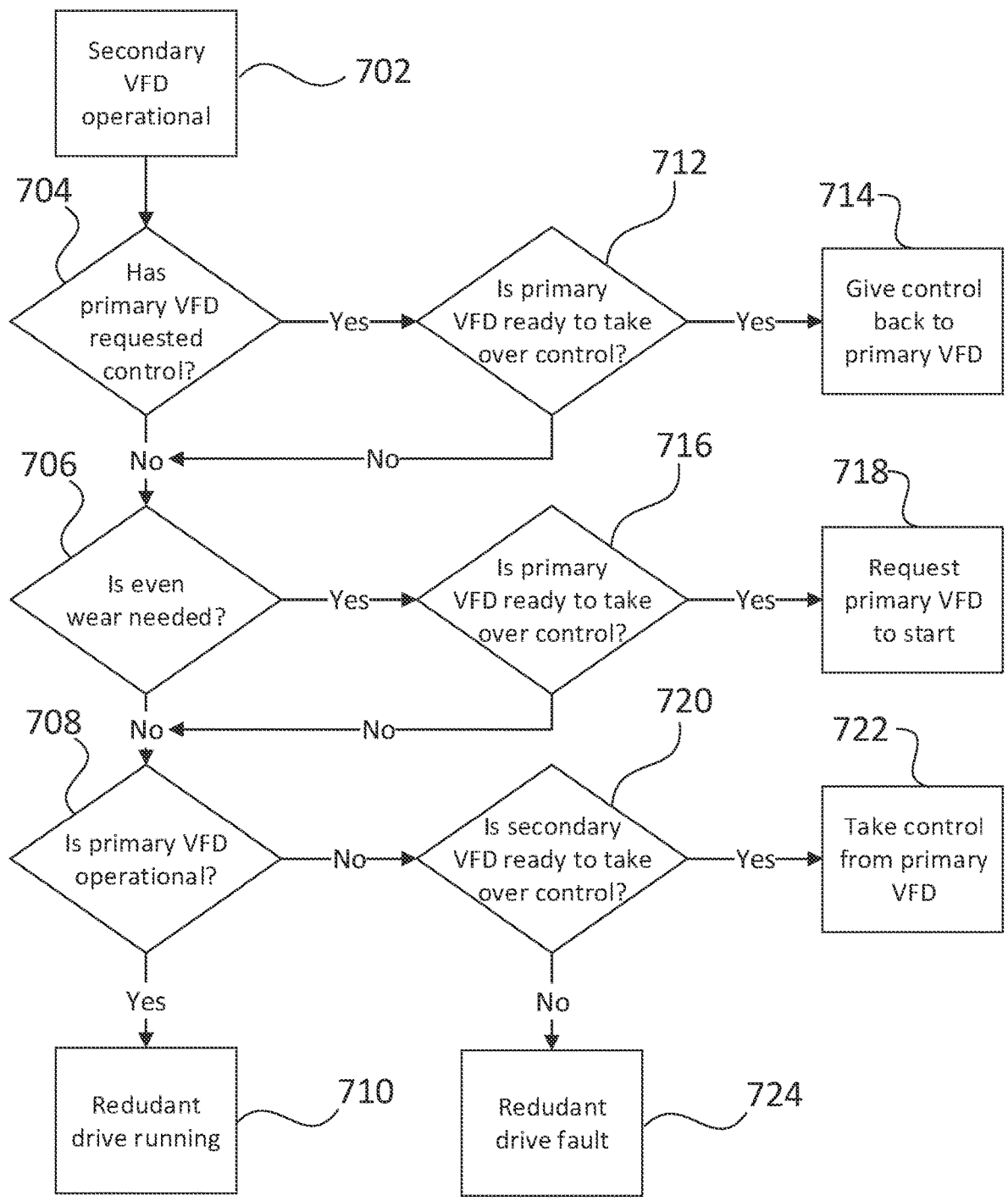
FIG. 7 illustrates a logic diagram for an operational secondary VFD in an embodiment of the present invention.

FIG. 7 illustrates a logic diagram for a primary VFD according to an embodiment of the present invention. The diagram begins with a secondary VFD that is operational 702. A determination may be made as to whether the primary VFD has requested control in query 704. If it is determined that the primary VFD has not requested control, a determination may be made as to whether even wear between the primary and secondary VFDs is needed in query 706. If even wear is not needed, a determination may be made as to whether the primary VFD is operation in query 708. If the primary VFD is operation, a determination 710 that a redundant drive is running may be made.

If, in query 704, it is determined that the primary VFD has requested control, a determination may be made as to whether the primary VFD is ready to take over control in query 712. If the primary VFD is ready to take over control, an operation 714 may be executed to give back control to the primary VFD. If the primary VFD is not ready to take over control, the logic process may proceed to query 706. If, in query 706, it is determined that even wear is needed, a determination may be made as to whether the primary VFD is ready to take over control in query 716. If the primary VFD is ready to take over control, a request 718 may be executed to start the primary VFD. If, in query 716, the primary VFD is not ready to take over control, the logic process may proceed to query 708. If, in query 708, it is determined that the primary VFD is not operational, a determination may be made as to whether the secondary VFD is ready to take over control in query 720. If the secondary VFD is not ready to take over control, an operation 722 may be executed to take control from the primary VFD.

In some embodiments, query 606 and/or query 706 may be optional and query 608 or query 708, respectively, may proceed immediately after it is determined the secondary drive is not operational in query 604 and/or query 704. In some embodiments, the logical processes depicted in FIGS. 6 and 7 may be carried out continuously by each VFD while the VFD is operational. In some embodiments, the logical processes depicted in FIGS. 6 and 7 may be carried out based on one or more programmable or pre-programed conditions being satisfied and/or based on a manual redundancy check procedure being initiated.

It will be readily appreciated that the logical processes of FIGS. 6 and 7 may be implemented in whole or in part within a control unit arranged within one or more VFD of a redundant VFD system. It will also be readily appreciated that the logical processes of FIGS. 6 and 7 may be scaled for operation of more than just two drives if a redundant VFD system includes more than just one secondary VFD of includes more than two identical VFDs.

Figure 8:
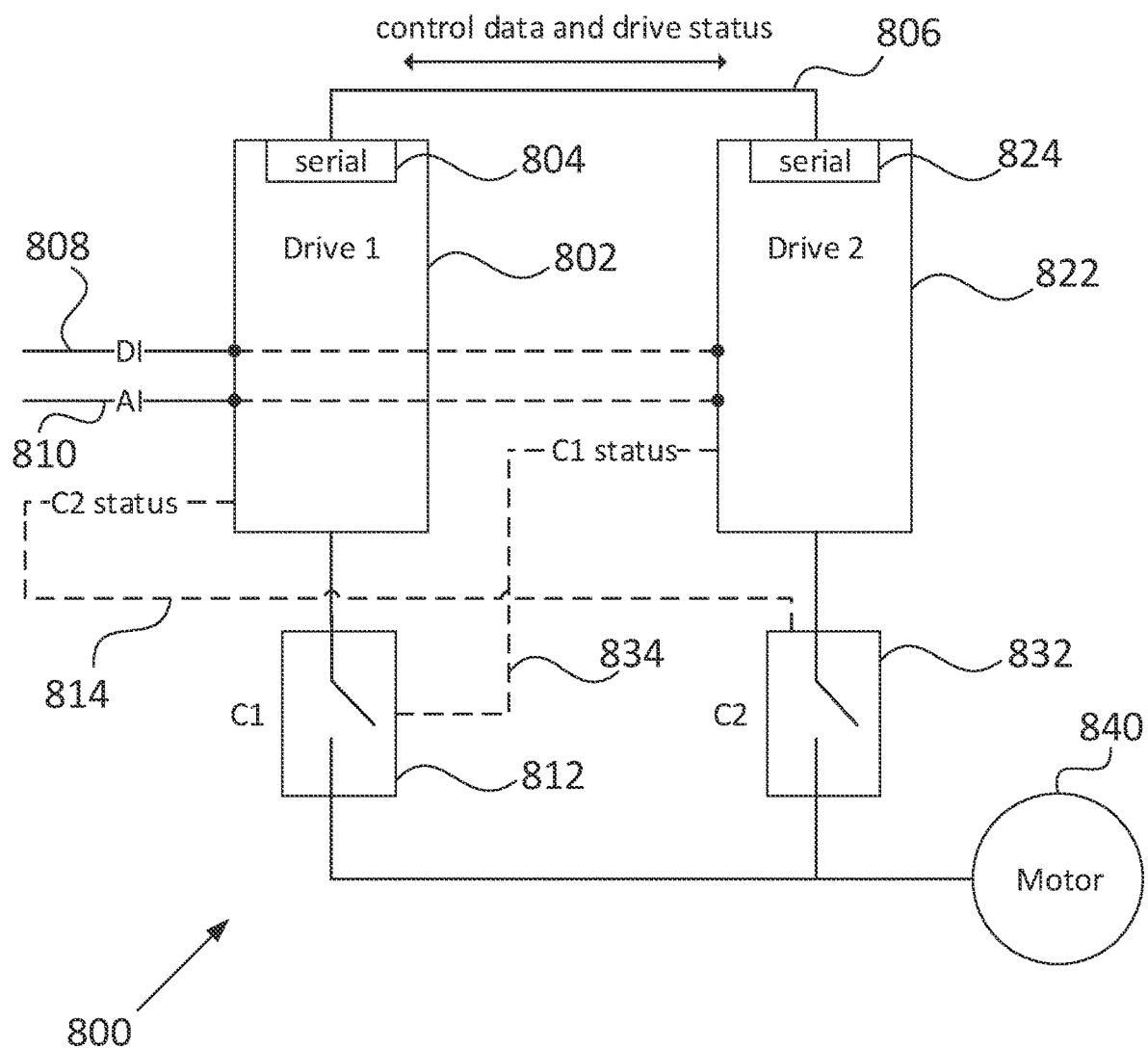
FIG. 8 illustrates a block diagram of a redundant VFD system according to an embodiment of the present invention.

FIG. 8 illustrates a block diagram of a redundant VFD system 800 according to an embodiment of the present invention. The redundant VFD system 800 illustrated includes a primary VFD 802 and secondary VFD 822. Each of the primary VFD 802 and the secondary VFD 822 include, respectively, a serial communication port 804, 824. The serial communication ports 804, 824 of the VFDs are connected via a serial communication link 806, the serial communication ports 804, 824 and the serial communication link 806 are configured to transmit control data of each VFD and a status of each VFD.

The primary VFD 802 receives digital input signals via digital input line 808 and analog input signals via analog input line 810. In some embodiments, the digital input line 808 and analog input line 810 both extend to each of the primary VFD 802 and the secondary VFD 822. In some embodiments, the digital input line 808 and the analog input line 810 extend to the primary VFD 802 and are passed on by the primary VFD 802 to the secondary VFD 822.

The primary VFD 802 is electrically connected to a first contactor 812, which is electrically connected to a motor 840. The secondary VFD 832 is similarly be electrically connected to a second contactor 832, which is electrically connected to the motor 840. The primary VFD 802 receives a status of the second contactor 832 via a second contactor status line 814 and the secondary VFD 822 receives a status of the first contactor 812 via a first contactor status line 834. In some embodiments, feedback logic based on the operational status of the first contactor 812 and/or the second contactor 832 is optional or excluded for operation of the redundant VFD system, as redundancy may be achieved by automatically opening a contactor when an associated VFD fails. In some embodiments, feedback logic based on the operational status of each contactor is preferable in order to increase the redundancy level of the redundant VFD system.

It will be readily appreciated that each VFD of a redundant VFD system may be programmed to take on the role of carrying out the logical routine as depicted in the figures or described above when the other VFD is operational. In other words, the primary VFD may instead carry out the queries by monitoring the secondary VFD. In this manner, the roles of redundancy monitoring and drive operation may be separately carried out by separate VFDs at all times. In some embodiments, both VFDs are configured to carry out redundancy monitoring operations, with one VFD configured to carry out an override of the other in case of competing data, or else each VFD configured to display an error indicating competing data. In some embodiments, only the secondary VFD is configured for redundancy monitoring, as the primary VFD may be operational by default and the secondary VFD may only be operational during a failure, maintenance, or repair of the primary VFD.

In some embodiments, one of the primary or secondary VFD of a redundant VFD system may be configured to periodically change operational status for the benefit of the overall system. For example, the primary VFD may be configured to periodically cease operation, triggering redundancy protocols that cause the secondary VFD to resume operation in place of the primary VFD. By doing so, the primary VFD may reduce wear on the primary VFD or balance wear of the primary and secondary VFDs to be similar. In some embodiments, wear is balanced by periodically shifting operation from one VFD to the other based on a predetermined time period. In some embodiments, wear is calculated based on one or more data inputs received by the primary VFD. For example, the primary VFD may consider time of operation, temperature data from internal sensors, and quantitative data regarding output drive currents to determine a wear condition. As a further example, a wear condition may be calculated to be small if an output drive current is relatively small over a relatively long period of time, but the wear condition may be calculated to be large if an output drive current is relatively large even for shorter periods of time. In some embodiments, the primary VFD may be configured to pre-emptively cease operation to avoid situations that would cause increased wear. For example, the primary VFD may determine that that its internal temperature exceeds a pre-determined threshold temperature beyond which accelerated wear can occur. Thus, the primary VFD may be not only reactively prevent damage to downstream components or to a redundant VFD system itself, but may be configured to proactively avoid damage or conditions that would impair the redundant VFD system's ability to perform optimally over long-term periods.

In some embodiments, the primary VFD and the secondary VFD may identical. Thus, modularity of VFDs within the redundant VFD system is improved with small increases in the overall size of the system. It will thus be readily appreciated that with exception to explicitly stated differences above in relation to size of the primary and secondary VFDs, descriptions regarding the function, programming, and operation of a primary VFD may be interchangeable with a secondary VFD and vice versa.

In some embodiments, it is possible to combine off-the-shelf VFDs to form a redundant VFD system as described herein. For example, so long as off-the-shelf VFDs are configurable to carry out the redundancy logic and include data connections as disclosed above, off-the-shelf VFDs may be arranged in the unique manner described to achieve a space-efficient and especially cost-effective redundant VFD system. In some embodiments, the secondary VFD may be a smaller and/or de-featured VFD of an equivalent power rating of the primary VFD.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A redundant variable-frequency drive (VFD) system comprising:
   a first VFD and a second VFD each configured to receive an operational status signal from the other, the second VFD being configured to output a drive signal to a motor based on receiving an operational status from the first VFD indicating the first VFD is non-operational;
   a circuit protection module electrically connected to each of the first VFD and the second VFD;

a mounting panel configured for mounting against a mounting surface, each of the first VFD, the second VFD, and the circuit protection module being configured to mount to the mounting panel in a vertically stacked configuration; and a housing configured to encase the second VFD and the circuit protection module against the mounting panel.

2. The redundant VFD system of claim 1, wherein the first VFD and the second VFD are configured to operate without input from an external controller.

3. The redundant VFD system of claim 1, wherein the first VFD is configured to output a warning or error message indicating loss of redundancy based on receiving an operational status from the second VFD indicating the second VFD is non-operational.

4. The redundant VFD system of claim 1, wherein the first VFD is configured to periodically toggle its operational status signal based on a calculated wear of the first VFD and the second VFD.

5. The redundant VFD system of claim 1, wherein the circuit protection module comprises a first contactor configured to receive an operating signal from the first VFD and a second contactor configured to receive an operating signal from the second VFD.

6. The redundant VFD system of claim 5, wherein each of the first VFD and the second VFD are configured to receive an open/close state of both the first contactor and the second contactor.

7. The redundant VFD system of claim 5, wherein the second VFD is configured to output the drive signal to the motor only when the second VFD detects that the first contactor is open.

8. The redundant VFD system of claim 1, wherein the first VFD and the second VFD each comprise a display configured to display an operating state of the respective VFD.

9. The redundant VFD system of claim 8 further comprising a serial communication link connected to an input/output port of each of the first VFD and the second VFD, and wherein the first VFD and the second VFD each comprise an input interface.

10. The redundant VFD system of claim 9, wherein the display of each of the first VFD and the second VFD are configured to display data transmitted from both the first VFD and the second VFD, and wherein the input interface of each of the first VFD and the second VFD are configured to control operation of both the first VFD and the second VFD.

11. The redundant VFD system of claim 9, wherein the first VFD and the second VFD are connected via a serial communication link, and wherein the serial communication link is configured to transmit data associated with the input interface.

12. The redundant VFD system of claim 11, wherein the serial communication link is further configured to transmit analog data directly between the first VFD and the second VFD.

13. The redundant VFD system of claim 1, wherein the first VFD and the second VFD have an equivalent power rating and the second VFD is smaller than the first VFD.

14. The redundant VFD system of claim 1, wherein the second VFD is stacked above the circuit protection module and the first VFD is stacked above the second VFD.

15. A method for operating a variable-frequency drive (VFD) system, comprising:
    providing a first VFD and a second VFD, wherein the first VFD and the second VFD having an equivalent power rating and the second VFD is physically smaller than the first VFD;
    configuring the first VFD and the second VFD to transmit their respective operating status to one another;
    operating the first VFD; and
    operating the second VFD when the second VFD receives an operating status from the first VFD indicating that the first VFD is non-operational.

16. The method of claim 15, further comprising providing a first control contact, the first VFD configured to output a drive signal and a control signal to the first control contact, and a second control contact, the second VFD being configured to output a drive signal and a control signal to the second control contact.

17. The method of claim 16, further comprising:
    configuring each of the first VFD and the second VFD to receive a control contact state signal from both the first control contact and the second control contact; and
    operating the second VFD only when the second VFD receives a control contact state signal from the first control contact indicating that the first control contact is open.

18. The method of claim 15, further comprising operating the first VFD and the second VFD without an external controller.

19. The method of claim 15, further comprising displaying a warning or error message indicating redundancy is lost when the first VFD is operating and the first VFD receives an operating status from the second VFD indicating that the second VFD is non-operational.

* * * * *